Patented Feb. 8, 1944

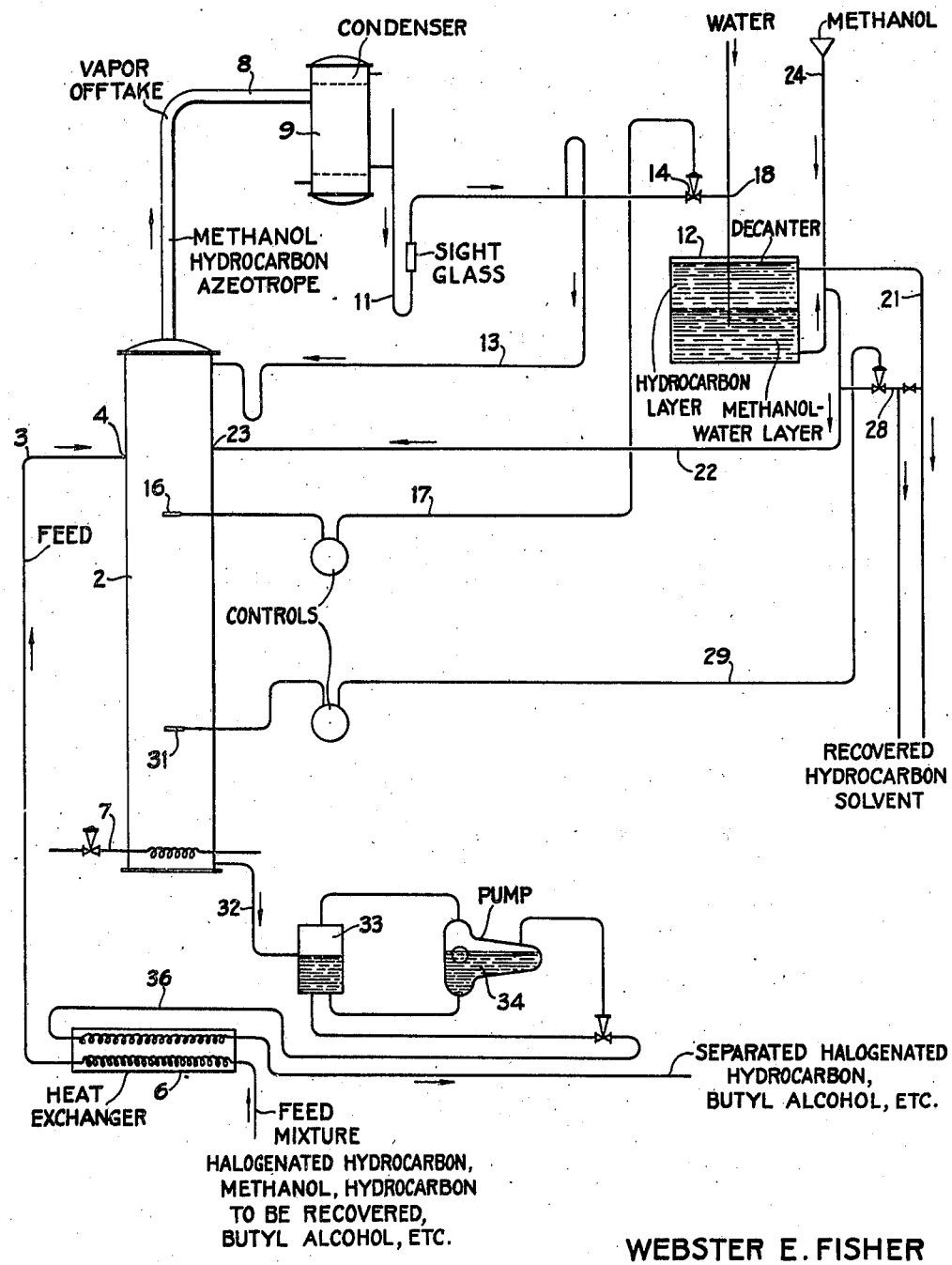

2,341,433

UNITED STATES PATENT OFFICE 2,341,433

SEPARATION OF SOLVENTS

Webster E. Fisher, Rochester, N. Y., assignor to Eastman Kodak Company, Rochester, N. Y., a corporation of New Jersey Application April 22, 1941, Serial No. 389,765

5 Claims. (Cl. 202—42)

This invention relates to the separation and recovery for reuse of certain hydrocarbon solvents and particularly certain cyclic hydrocarbon compounds.

In industrial use the aforementioned solvents may become mixed with other components. Generally before a solvent is susceptible of reuse it is necessary to fully or at least partially separate the solvent from certain or all of the components with which it may have become mixed. However, it frequently happens that components which have become mixed with a hydrocarbon solvent, as above discussed, form azeotropes therewith; hence, separation by simple distillation is not possible. Or, it may be that the mixture cannot be separated, not because of the formation of an azeotrope, but because the components of the mixture have boiling points that are close to one another. Therefore, a further substance which withdraws (combines azeotropically) with a solvent to be recovered may be added to facilitate separation and recovery. However, certain prior art processes, involving the addition of a third substance, possess the disadvantages that for every part of the solvent recovered approximately two or more parts of the agent would have to be distilled. That is, the quantity of materials handled and the heat input required is greatly increased the larger the quantity of withdrawing agent required to permit the separation and recovery of a unit of the solvent desired to be recovered.

For a more detailed consideration of the problem reference is made to the cyclic hydrocarbon cyclohexane, which is employed industrially as a solvent. If this compound becomes mixed with certain other compounds the resultant mixtures may not be separated by simple distillation. For example, if halogenated compounds such as ethylene chloride become mixed with cyclohexane such non-separable mixtures are obtained. Ethylene chloride boils at about 83° C. and cyclohexane boils at about 80° C. The two components form a constant boiling mixture boiling at approximately 75° C. Separation of these components by fractional distillation at atmospheric pressure may, therefore, be considered as impossible. Or, as pointed out in "Distillation Principles and Processes" by Young, at page 51, cyclohexane forms a constant boiling mixture with benzene. It can be seen from the foregoing that there are various instances under which the mixtures containing cyclic hydrocarbons may exist which present difficulties of separation by fractional distillation. The methods which have been suggested for separating such mixtures have involved the addition of rather large quantities of compounds to cause the separation. That is, in order to separate one part of the solvent two or more parts of the separating agent have been required.

It is, therefore, apparent that the development of new processes for the separation of solvents of the foregoing type, which processes require the addition of smaller amounts of withdrawing agents, is a highly desirable result.

This invention has for one object to provide a method of separating hydrocarbon solvents in admixture with one or more other compounds which form an azeotrope therewith. Still another object is to provide a method particularly adapted to the separation and recovery of cyclic hydrocarbon solvents from mixtures of solvent with halogeneated compounds such as ethylene dichloride. A still further object is to provide a novel separatory and recovery process for the aforementioned mixtures employing the addition of a withdrawing agent, but wherein the quantity of withdrawing agent required is substantially less than has been heretofore required. Still another object is to provide a process particularly adapted to the separation of cyclic hydrocarbons such as cyclohexane, requiring the use of less than two parts of withdrawing (separating) agent for each part of the cyclohexane solvent recovered. A still further object is to provide a novel mixed-withdrawing or separating agent for use in processes of separating and recovering the aforementioned cyclic hydrocarbon solvent. Other objects will appear hereinafter.

After extensive investigation I have found that methyl alcohol is a highly efficient addition withdrawing agent to add to non-separable hydrocarbon mixtures, as already discussed, for facilitating the separation and recovery of a component thereof. The amount of this agent required, as compared with other agents, is considerably smaller, being substantially less (in the azeotropic distillate) than twice the weight of the cyclic hydrocarbon solvent being separated.

While I have referred to the use of methyl alcohol as a withdrawing agent it is not necessary that alcohol be the sole constituent. Other compounds may be present with the methyl alcohol which will be described in further detail hereinafter. Certain agents which may be added to the methyl alcohol may reduce (but not necessarily in every instance) the quantitative efficiency in that a larger quantity may be required in operating a certain process than if a withdrawing agent comprising substantially solely the methyl alcohol were employed.

However, the addition of certain components to the methyl alcohol may be desirable under some circumstances for obtaining a boiling point of the azeotrope which indirectly permits the use of a different length column or for other reasons. However, in general I prefer to employ a withdrawing agent comprised at least of 50% of methyl alcohol, but, as indicated, certain additives may be supplied thereto, as will be discussed in detail hereinafter.

For a more complete understanding of my invention, reference will be made to the attached drawing, showing a side elevation view of one arrangement of apparatus which might be employed for carrying out my process. The drawing also is somewhat in the nature of a flow sheet. The particular apparatus shown represents my preferred embodiment wherein my novel process may be carried out in a continuous manner. However, it is to be understood, as will be discussed in greater detail in connection with Examples 1-3 that my process may be carried out in standard bubble plate distillation columns and either in a batch or continuous manner; hence, my disclosure of a preferred apparatus construction is not to be considered a limitation upon my invention.

Referring now to the drawing, 2 represents a conventional type of distilling column, containing for example 40-60 plates. The feed conduit 3 leads to the column preferably at some point in the intermediate section as at 4. The feed conduit may pass through a heat exchanger as at 6. Suitable heating means, as for example the closed steam coil 7, may be provided at the base of the column for supplying heat.

The upper section of the column is provided with a vapor-pipe 8 which leads through condenser 9 and conduit 11 to the decanter 12. The condensate line 11 may have attached thereto a branch line 13 which leads back to the upper part of column 2.

The condensate line 11 may also include in its circuit a valve 14 attached to the controller 16 through the line 17 for use in the automatic control of the column. Also at point 18, if desired, provision may be made for introducing water or other material into the system, as will be described in more detail hereinafter under Example 4.

The decanter 12 may be more or less of standard construction for continuous decantation. A conduit such as 21 is attached to one portion of the decanter for recovering one of the layers therefrom. Another conduit, as 22, is connected with another section of the decanter for removing another layer therefrom. This latter conduit leads back to column 2 at, for example, point 23, and in this conduit line may be provided means indicated at 24 for introducing components into the column as reflux. The conduits 21 and 22 may be interconnected by the valved conduit 28 attached through line 29 to the control 31 for permitting more or less automatic control of the components and the ratios thereof which it is desired to remove or reflux, as respects the distillate part of the system.

The lower part of column 2 may discharge through conduit 32 into some suitable reservoir means 33 connected to a pump 34 for discharging the hot residue materials from the distillation by conduit 36 through the heat exchanger already described. In view of the various legends appearing on the drawing, the construction and operation thereof is apparent to a substantial extent. However, further disclosure with respect to my preferred apparatus will be set forth under Example 4 hereinafter.

For a more complete understanding of the process aspects of my invention, several examples of the operation of my process will be set forth, the process being carried out in either a batch or continuous manner, in either a standard bubble cap distillation column or a column such as described in the attached drawing, as may be desired. In the operation of my process, the withdrawing agent may be added to the process at various points in the system or may be premixed with the mixture to be separated, or a combination of such steps may be employed. While in the continuous operation of my process I described one method of obtaining reflux to the distillation, it is to be understood that the reflux may be supplied by dephlegmation of other condensation treatment of the distillate, or a combination of these procedures, together with the introduction of the feed at the upper part of the column. Various other variations in the technique of operating my process will be apparent as the description proceeds.

In the first of the following examples I have described my process with particular reference to the various withdrawing agents which may be employed. In later examples I have described my process with particular reference to its continuous operation in a process such as shown in the attached drawing.

*Example 1*

In accordance with this example the mixture to be separated was comprised of a major proportion of ethylene chloride, (approximately from 30% to 75%) of ethylene chloride, the balance of the mixture being the cyclic hydrocarbon, cyclohexane, together with some butyl alcohol and the like. These latter constituents, as far as the instant process is concerned, can be more or less disregarded inasmuch as it can easily be separated from the ethylene chloride residue by water extraction or other procedure. It merely happened that the particular mixture of halogenated hydrocarbon-hydrocarbon solvent to be separated contained a small amount of this alcohol. Because of the fact, as discussed above, that ethylene dichloride forms a constant boiling mixture boiling at approximately 75.1° C. with cyclohexane, the mixture may be considered non-separable by fractional distillation at atmospheric pressure. However, the foregoing difficulty was overcome by incorporating with the mixture to be separated a content of methyl alcohol. The amount of methyl alcohol employed was approximately sufficient to form an azeotropic mixture with this cyclic hydrocarbon. However, other amounts of methyl alcohol could be employed, as in a continuous process, less than the azeotropic amount could be employed due to continuous recycling. Or, of an excess of methyl alcohol is incorporated, the excess may be removed with the ethylene chloride residue. On the other hand, if it is desired that all of the methanol be finally eliminated as distillate, this can be accomplished by refluxing a portion of the separated cyclic hydrocarbon obtainable through conduit 21. In any event the methyl alcohol withdrawing agent is incorporated in some convenient manner with the components to be separated.

The mixture of the ethylene chloride, cyclohexane, and the methyl alcohol may be supplied to the still pot of a conventional bubble cap distillation column of 40-60 plates and distillation conducted batchwise with reflux. In the event of operation in a continuous manner a certain portion of the condensate from the column is returned for reflux as in both batch and continuous operation, but the feed mixture is preferably added to an intermediate section of the column. Or, if desired, the feed mixture may also be added to the upper portion of the column so that it may assist in furnishing reflux.

The distillate obtained from the top of the column comprised approximately 39% methyl alcohol and approximately 61% cyclohexane. It can be seen from this that the methyl alcohol exhibits a very high capacity for withdrawing the cyclohexane. That is, less than one part of methyl alcohol is required to withdraw (permit the separation of) one part of the cyclohexane.

Although I have described my invention particularly with reference to the separation of cyclohexane by using an alcoholic withdrawing agent (either simple or mixed) for this purpose, as indicated above, it is possible to reverse the process to some extent and employ the cyclic hydrocarbon for separating the alcohol component either simple or mixed. That is, as indicated, if methanol were mixed with ethylene dichloride by supplying the cyclic hydrocarbon to the process it would be possible to separate the alcoholic component to obtain the ethylene chloride residue. In the event a mixture of the alcohol and addition agent were present and the cyclic hydrocarbon were returned to function as the separating agent, a ternary azeotrope would be removed. Such procedure, wherein I may employ my process somewhat in the reverse of the preferred embodiment by using cyclic hydrocarbon to remove the alcoholic component from the mixture, is believed apparent from the description herein set forth.

Under the conditions of the present example the azeotrope between the methyl alcohol and the cyclohexane boils at approximately 54° C. Under ideal conditions this azetrope would comprise approximately 62% of cyclohexane. On the other hand, the methyl alcohol-ethylene chloride azeotrope boils at approximately 61° C. Therefore, in fractionation of the mixture in accordance with the foregoing example, due regard for this fact should be had if it is desired to obtain a relatively pure cyclohexane free from any amounts of ethylene dichloride. This may be accomplished by carefully controlling the fractionation and employing a column of sufficient length.

However, my invention is not limited in this respect as in some instances it is not necessary to obtain a complete separation, but a partial separation is entirely satisfactory, and the fact that the recovered cyclic hydrocarbon solvent also contained a few percent of halogenated solvent would not be objectionable. The butanol content or other high boiler will be found in the ethylene chloride residue of the distillation and may be removed by extraction as, for example, water extraction analogous to that described in co-pending application 303,924 in which I am a joint inventor with William H. Shearon, Jr., after which the aqueous butyl alcohol (together with any methyl alcohol which may be present, assuming that the excess of the methyl alcohol withdrawing agent had been employed) could be further processed as described in co-pending application Serial No. 269,193 in which I am a joint inventor with Albert G. Bright. In other words, by some suitable procedure of which the foregoing is only illustrative, the butyl alcohol may be removed and methyl alcohol separated, which methyl alcohol, together with that present in the cyclohexane distillate, may be recycled to the process. The methyl alcohol with the cyclohexane distillate may also be separated by extraction followed by distillation from the extract in a manner comparable to the foregoing.

In the preceding example I have described the use of methyl alcohol for separating mixtures of ethylene chloride and cyclic hydrocarbon, which mixtures, due to the formation of constant boiling mixtures as already discussed, may be considered as substantially inseparable by normal distillation. My invention is not limited to the use of methanol alone. It is, however, evident that a maximum amount of cyclohexane solvent may be separated by the use of methyl alcohol inasmuch as less than one part of methyl alcohol is required to withdraw one part of the cyclohexane. However, there are certain other addition agents which may be incorporated with the methyl alcohol and a ternary azeotrope between the methyl alcohol, the addition agents, and the cyclohexane solvent would be formed, thereby also permitting the separation of the cyclohexane solvent.

*Example 2*

In accordance with this example the separation of the mixture was accomplished by employing a mixed-withdrawing agent comprising methanol having incorporated therewith a content of a ketone (acetone). In this example the mixture to be separated was substantially comparable to the mixture described in Example 1 in that it comprised a major proportion of ethylene chloride and a minor proportion of cyclohexane. In order to obtain separation, the withdrawing agent, methanol, containing some acetone, was incorporated in the mixture so that the final mixture processed in the bubble cap distillation column of the type referred to in Example 1, was approximately 60% ethylene chloride, more than 10% cyclohexane, more than 9% methanol, and a content of acetone less than the percentage of the methanol.

The mixture was heated in the distillation column with reflux and between approximately 51.1° C. and 56.2° C. cuts were taken which showed 19% to 28% methyl alcohol, 43% to 47% cyclohexane, no ethylene dichloride, and the balance acetone. The foregoing shows that the addition of methanol-acetone (mixed withdrawing agent) also permitted the separation of the cyclohexane from the ethylene chloride. While it was not determined by analysis that the ethylene chloride residue was free from the cyclohexane solvent, the portion distilled below 56.2° C. was found to contain approximately 96% of the cyclohexane; therefore, satisfactory operation was obtained. While the composition of the distillate does not check exactly with the experimentally determined ternary azeotrope of 16% methanol, 40.5% cyclohexane and 43.5% acetone, inasmuch as the quantity of the solvent exceeds the percentage of the constant boiling mixture this is an advantage in the operation of my process.

Assuming that in accordance with Example 2 an excess of the mixed withdrawing agent, methyl alcohol-acetone, is employed there would be obtained separation into two portions as follows:

The distillate portion, as discussed above, would contain the methyl alcohol and the cyclohexane together with some acetone. The residue portion of the distillation would contain the ethylene chloride mixed with excess methyl alcohol and excess acetone. If there were present in the original mixture for example butanol, amyl alcohol, or the like, these higher boiling alcohols would likewise remain in the residue.

The withdrawing agent in the distillate may be separated by extraction followed by distillation of the extract (in accordance with applications 269,193 and 303,924 already referred to above) and the separated withdrawing agent recycled to the same process, if in continuous operation, or to another process in parallel operation. The excess methyl alcohol and the like, if any is present in the ethylene chloride residue, may be removed therefrom also by procedure such as set forth in the above-mentioned applications 269,193 and 303,924.

My invention, therefore, contemplates employing a mixed methyl alcohol withdrawing agent and is not limited to carbonyl compounds as an added component, but other compounds which permit the formation of a ternary azeotrope may comprise the second ingredient as will be apparent from the following example:

*Example 3*

In accordance with this example the mixture to be separated was an ethylene chloride containing mixture as already described in detail in the preceding examples. However, in this run the methanol withdrawing agent has incorporated therewith a content of methyl acetate. The withdrawing agent of methyl alcohol-methyl acetate and the ethylene chloride-cyclohexane mixture to be separated were all incorporated in a bubble plate distillation column and distillation conducted in a manner comparable to that already described in the preceding examples. However, in this example the distillate obtained was in the nature of a ternary azeotrope boiling at approximately 50.8° C. and comprising approximately 17.8% methyl alcohol, 33.6% cyclohexane, and the balance methyl acetate. The methanol-methyl acetate withdrawing agent may be separated from the cyclohexane by extraction and distillation of the extract and returned for reuse. Likewise, the ethylene chloride residue from the distillation, if it contains any excess methanol and methyl acetate, may be extracted free of these materials by water extraction, the extract being combined with the extract from the distillate and the two distilled to obtain the methanol-methyl acetate withdrawing agent for reuse.

*Example 4*

For a better understanding of this example reference will be made to Fig. 1. In this example the mixture to be separated comprises halogenated hydrocarbon and cyclic hydrocarbon substantially inseparable by ordinary distillation, as already described in the preceding examples. The mixture also included a content of butyl alcohol in an amount between 6%–10%. The methyl alcohol withdrawing agent was also included in this feed mixture which was supplied through heat exchanger 6 to column 2, through the feed conduit 3. Steam was supplied to the lower part of the column 2 by the opening of the valve in the line 7.

The vapors generated in the column pass up through the column and are contacted by the reflux, comprising any components returned through lines 13 and 22 and the feed supplied to the column as already described. The column is so regulated (in an automatic manner if desired and as will be described) so that the methanol withdrawing agent forms a constant boiling mixture with the cyclohexane and is distilled off from the column through conduit 8. Assuming that a content of acetone or methyl acetate were present as in the instance of certain of the preceding examples, these compounds would likewise distill off in conjunction with the methanol and cyclic hydrocarbon. In some instances a small amount of the ethylene chloride or other halogenated hydrocarbon in the column may pass out through the vapor offtake conduit. However, the amount of this compound is only a few per cent, hence, separation may be considered relatively complete.

The condensate essentially comprised of the hydrocarbon solvent (for example, cyclohexane) being recovered and the agent is condensed in condenser 9 and passes through conduit 11 to the decanter 12.

The amount of the condensate passed through the decanter as compared with the amount thereof being returned to column 2 through reflux line 13 may be more or less automatically controlled by the valve 14 which responds to the registration of the controller 16. That is, if the temperature of controller 16 rises too high, valve 14 would be closed to some extent, thereby causing more reflux through the line 13 which in turn reduces the temperature within the column, permitting the temperature controller to regain the desired temperature for that particular reaction in the column. The exact temperature as indicated is one such that substantially only the methanol withdrawing agent and hydrocarbon solvent azeotrope is being distilled off, and this may vary, depending upon the particular compositions of the mixture and the location of the temperature recording means 16, but in view of the disclosure herein, this could be ascertained by one skilled in the art in processing any particular mixture. In general, the temperature of controller 16 would be somewhere between about 55° C. and 65° C. That is, since the methanol-hydrocarbon binary azeotrope boils at approximately 54° C., the uppermost plate of the column should not exceed this temperature. The temperature within the column would vary from the lowest temperature at the uppermost plate to the highest temperature at the bottom of the column where the heat was applied. For example, the temperature at the bottom of the column might be in the neighborhood of 60° C.–90° C. The temperatures will differ slightly, depending upon the exact ingredients contained in the azeotrope. As already pointed out, in the event a ternary azeotrope is involved containing methyl acetate, the temperature at the top plate of the column might be approximately only 50° C., which temperature throughout the column may be controlled by the quantities of heat introduced at 7 and the reflux returned through lines 13 and 22.

If a substantially pure methyl alcohol-hydrocarbon solvent azeotrope is condensed in condenser 9 and conducted through conduit 11 to the decanter 12, the methyl alcohol will tend to separate, forming the lower layer in the decanter and the hydrocarbon will tend to separate in the decanter to form the upper layer. However, if certain components are in the azeotrope, as for example acetone, the condensate may approach complete miscibility. However, in any instance for obtaining separation it has been found that the addition of an aqueous medium into the decanter as at point 18, facilitates the separation of the condensate into phases. This addition may comprise, for example, a small amount of water as 1%-8%.

In any event, the components, after being separated, would be further utilized as follows: The upper layer comprised principally of the hydrocarbon solvent would be withdrawn through conduit 21 to storage, reutilization, or further processing, as already referred to in the preceding examples.

The lower or methanol withdrawing agent layer would be withdrawn through conduit 22 and returned to column 2 at point 23 for reflux. If not all of this layer should be desired to be returned as reflux, a portion can be by-passed through conduit 28, either for storage or other use.

The materials leaving the base of the column through conduit 32 comprise, for example, the halogenated hydrocarbon from which the hydrocarbon solvent and methanol have been removed. The exact composition of the residue materials will vary somewhat, depending upon the composition of the feed. However, the materials, whatever their composition, usually comprised primarily of halogenated hydrocarbon, would be conducted through the chamber 33 and pumped by means of pump 34 through the heat exchanger 6 already referred to, from which the residue materials could be conducted to storage, reuse, or further processing as by extraction and/or distillation as described in the preceding examples. In the operation of my process it is desirable at all times to have an adequate amount of the methyl alcohol withdrawing agent present to withdraw the hydrocarbon solvent which is being recovered. Under many conditions in continuous operation the amount of methanol returned through conduits 13 and 22 may suffice. However, in other instances, the quantity of methanol may be increased by adding methanol to the feed mixture through conduit 3 or adding methanol at point 24.

In general it is satisfactory to merely return a proportion of methanol required to perform the function of forming the particular constant boiling mixture with the hydrocarbon solvent and other compounds which it may be desired to volatilize through conduit 8. This control can automatically be accomplished, as indicated above, by automatic controller 16 being connected with the automatic valve 14 which is caused to be opened or closed as the case may be to hold the temperature, at point 16 or other point intermediate of the column, within the temperature range already discussed for obtaining the distillation of the desired mixture.

It is, therefore, apparent from the foregoing that my process may be readily carried out in a continuous manner with little, if any, manual control once the process has been put in operation, the automatic controls at 16 and 31 taking care of any variation that may occur in the composition of the feed or other changes in the process.

In the operation of my process exact proportions of the methanol, together with any addition agent which would be incorporated in the mixture to be separated, may be varied, although as pointed out, preferably a substantial amount of methyl alcohol would be employed in the withdrawing agent because, as indicated, generally the largest amount of hydrocarbon solvent being separated would be obtained in the distillate, the larger the content of methyl alcohol in the withdrawing agent. However, the employment of excesses would merely cause the appearance of these compounds in the ethylene chloride residue from which they may be separated as described, if a relatively pure ethylene chloride is desired. It will be observed in Example 3 that the boiling point of the ternary azeotrope is approximately 50° C., namely, the lowest boiling point azeotrope of any of the examples, and therefore it may be employed in instances where such low boiling point may be of advantage.

It will likewise be observed from a consideration of the preceding examples that with the exception of the binary azeotrope of Example 1, the ternary azeotropes containing methanol of Examples 2 and 3, carry over a much larger percentage of cyclohexane solvent than other binary azeotropes would carry over. That is, the ternary azeotrope of Example 2 under practical operations contains 43% to 47% cyclohexane, whereas, according to Lecat in the publication "Azeotropisme," 1918, Lecat's No. 1096, only 8% of cyclohexane would be contained in the binary azeotrope with, for example, acetone. It is, therefore, apparent that in all of my examples I have shown procedure whereby a substantially larger amount of cyclohexane may be carried over in my distillation processes and in all the examples less than two parts of the withdrawing agent are required to permit the separation of one part of the cyclic hydrocarbon solvent.

While in general my withdrawing agent would be comprised of a major proportion of methyl alcohol, my invention is not limited to the exact embodiments described, and the methyl alcohol may be in admixture with other ingredients such as varying amounts of methtyl acetate and the like, as already described. In general the additive agent should be a compound which permits the formation of a ternary azeotrope between the methyl alcohol, the added agent, and the hydrocarbon solvent to be separated as the distillate. Also the added agent would preferably be a component which lends itself to easy separation from the hydrocarbon distillate so that the methyl alcohol and the added agent may be conveniently separated and reused in the separation and recovery of further mixtures.

In the preceding description I have indicated methyl alcohol as my preferred withdrawing agent inasmuch as this alcohol is relatively inexpensive and from the data set forth herein it can readily be seen that extremely efficient separation action is obtained with this alcohol. However, there are certain other alcohols which may be employed in some instances in place of the methyl alcohol. For example, ethyl alcohol may be utilized, but due to legal restrictions and certain other factors it is not considered as satisfactory as the methyl alcohol. Normal propyl alcohol likewise may be employed, but this higher alcohol is slightly more expensive and produces higher boiling mixtures. On the other hand, the use of isomeric alcohol, isopropyl alcohol, would involve the separation of such close-boiling mixtures that this alcohol would probably not be employed in my process inasmuch as satisfactory separations would not be obtained in conventional distillation columns.

When I refer to an alcohol withdrawing agent herein I refer to withdrawing agents as described which may be comprised of either substantially pure alcohols or, for example, methyl alcohol mixed with some other ingredient which forms a ternary azeotrope with the cyclic hydrocarbon to be recovered.

While I have described my invention with particular reference to ethylene chloride-containing mixtures, inasmuch as such mixtures are obtained industrially in certain processes my invention is not limited to the processing of this particular non-separable mixture. As pointed out in the first part of this specification, somewhat similar non-separable mixtures exist between, for example, benzene and cyclohexane, and my invention employing methyl alcohol withdrawing agent for the separation of such mixtures may also be carried out, and in this instance the benzene would constitute the residue of the distillation and the cyclohexane solvent would be obtained in the distillate, as already fully described.

Still further examples of materials other than the foregoing from which cyclohexane is difficult to separate, either because of the formation of an azeotrope or because of the closeness of boiling points, will be set forth. For example, allyl alcohol boiling at 97° C. is reported to form a constant boiling mixture with cyclohexane boiling at 74° C. and containing cyclohexane. These two components, therefore, may not be separated by straight fractional distillation. Since allyl alcohol does not form a constant boiling mixture with my methyl alcohol withdrawing agent, my method of separation might be employed in this instance.

Propylene chloride, boiling at 96.8° C., forms a constant boiling mixture with cyclohexane, boiling at 80.4° C., and containing 84% cyclohexane. The separation of cyclohexane from propylene chloride would be strictly analogous to the separation of cyclohexane from ethylene chloride. The constant boiling mixture between methyl alcohol and propylene chloride boils at 62.9° C., and contains 53% methyl alcohol by weight.

Trichlorethylene boiling at 87° C. does not form an azeotrope with cyclohexane but would be rather difficult to separate because of the proximity of the boiling points. By the process involving distillation with methyl alcohol or other of my agents, the cyclohexane could be readily removed from the trichlorethylene. Trichlorethylene and methyl alcohol, however, do form a constant boiling mixture boiling at 60.2° C. and containing 36% methyl alcohol, which factor would be taken into consideration.

It is apparent from the examples that the use of methyl alcohol in processes of the type described is advantageous in that the methyl alcohol requires the employment of less than one part thereof for the removal of one part of the solvent, and in the case of a mixed withdrawing agent likewise only a small amount over one part would be required, thereby correspondingly reducing the volume of materials which may be handled in the recovery processes.

It is apparent from the foregoing that my invention is susceptible to modification, hence, I do not wish to be restricted excepting insofar as is necessitated by the prior art and the spirit of the appended claims.

I claim:

1. A process for separating cyclohexane from mixtures containing predominant quantities of cyclohexane and chlorinated hydrocarbons, said chlorinated hydrocarbons being selected from the group consisting of ethylene chloride and propylene chloride, which comprises adding methanol to the mixture and distilling off the resulting cyclohexane and methanol azeotrope.

2. A process for separating cyclohexane from mixtures containing predominant quantities of cyclohexane and chlorinated hydrocarbons, said chlorinated hydrocarbons being selected from the group consisting of ethylene chloride and propylene chloride, which comprises adding methanol to the mixture, distilling off the cyclohexane and methanol azeotrope, and then separating the methanol from the cyclohexane by adding water to said azeotrope.

3. A process for separating cyclohexane from mixtures containing predominant quantities of cyclohexane and chlorinated hydrocarbons, said chlorinated hydrocarbons being selected from the group consisting of ethylene chloride and propylene chloride, which comprises adding an entraining liquid containing at least 50% methanol to the mixture, distilling off the resulting cyclohexane and methanol azeotrope, separating the methanol from the cyclohexane by adding water to said azeotrope, and collecting the chlorinated hydrocarbon from the residue of the distillation.

4. A process for separating a minor amount of cyclohexane from a mixture containing a major amount of a chlorinated hydrocarbon solvent, selected from the group consisting of ethylene chloride and propylene chloride, which comprises adding methanol to the mixture in an amount approximately equal to two-thirds the amount of the cyclohexane present in the mixture and distilling off the resulting cyclohexane and methanol azeotrope.

5. A continuous process for separating cyclohexane from a mixture containing predominant quantities of cyclohexane and chlorinated hydrocarbons, said chlorinated hydrocarbons being selected from the group consisting of ethylene chloride and propylene chloride, which comprises continuously distilling the mixture in the presence of a substantial amount of methanol, continuously collecting a distillate of a cyclohexane-methanol azeotrope, continuously returning a portion of the distillate to the distillation for reflux, continuously extracting the methanol from the remaining distillate with water, and returning a portion of the methanol to the distillation for reflux.

WEBSTER E. FISHER.